United States Patent
Li et al.

(10) Patent No.: US 8,331,212 B2
(45) Date of Patent: Dec. 11, 2012

(54) MEMS MEMORY MICROPROBE AND RECORDING APPARATUS

(75) Inventors: Yongfang Li, Tokyo (JP); Yasushi Tomizawa, Fuchu (JP); Gen Hashiguchi, Fussa (JP); Masakazu Sugiyama, Yokohama (JP)

(73) Assignees: Kabushiki Kaisha Toshiba, Tokyo (JP); The University of Tokyo, Tokyo (JP)

( * ) Notice: Subject to any disclaimer, the term of this patent is extended or adjusted under 35 U.S.C. 154(b) by 0 days.

(21) Appl. No.: 13/016,464

(22) Filed: Jan. 28, 2011

(65) Prior Publication Data

US 2011/0194398 A1    Aug. 11, 2011

(30) Foreign Application Priority Data

Jan. 29, 2010 (JP) ................. 2010-019674

(51) Int. Cl.
G11B 7/00 (2006.01)
(52) U.S. Cl. ....................... 369/126; 365/145
(58) Field of Classification Search .......... 369/126; 365/49.13, 65, 145
See application file for complete search history.

(56) References Cited

U.S. PATENT DOCUMENTS

| | | | |
|---|---|---|---|
| 5,610,898 A * | 3/1997 | Takimoto et al. | 369/126 |
| 6,072,764 A * | 6/2000 | Shido et al. | 369/126 |
| 7,233,517 B2 | 6/2007 | Rust | |
| 7,239,544 B2 * | 7/2007 | Chen et al. | 365/163 |
| 2004/0105380 A1 * | 6/2004 | Cho et al. | 369/126 |
| 2006/0023606 A1 * | 2/2006 | Lutwyche et al. | 369/100 |
| 2007/0165512 A1 * | 7/2007 | Harada et al. | 369/126 |

FOREIGN PATENT DOCUMENTS

| | | |
|---|---|---|
| JP | 60-20339 | 2/1985 |
| JP | 61-39956 | 2/1986 |
| JP | 2001-062791 | 3/2001 |
| JP | 2006-221792 | 8/2006 |
| JP | 2007-511027 | 4/2007 |

OTHER PUBLICATIONS

Notice of Reasons for Rejection issued by the Japanese Patent Office on Feb. 22, 2011, for Japanese Patent Application No. 2010-019674, and English-language translation thereof.
Notice of Reasons for Rejection, issued by Japanese Patent Office, dated Dec. 13, 2011, in Japanese patent application No. 2010-019674 (2 pages).

\* cited by examiner

*Primary Examiner* — Thomas Alunkal
(74) *Attorney, Agent, or Firm* — Finnegan, Henderson, Farabow, Garrett & Dunner, L.L.P.

(57) ABSTRACT

According to one embodiment, a MEMS memory microprobe includes a probe tip, a lever, and a base. The probe tip is arranged to oppose a recording medium and is brought into contact with the recording medium to perform recording or reproduction of information when a current or voltage is applied between them. In the probe tip, a plurality of electrodes used in the recording or reproduction and a plurality of support portions which form the probe tip together with the electrodes are alternately arranged, and the electrodes and the support portions form a single plane which opposes the recording medium.

12 Claims, 7 Drawing Sheets

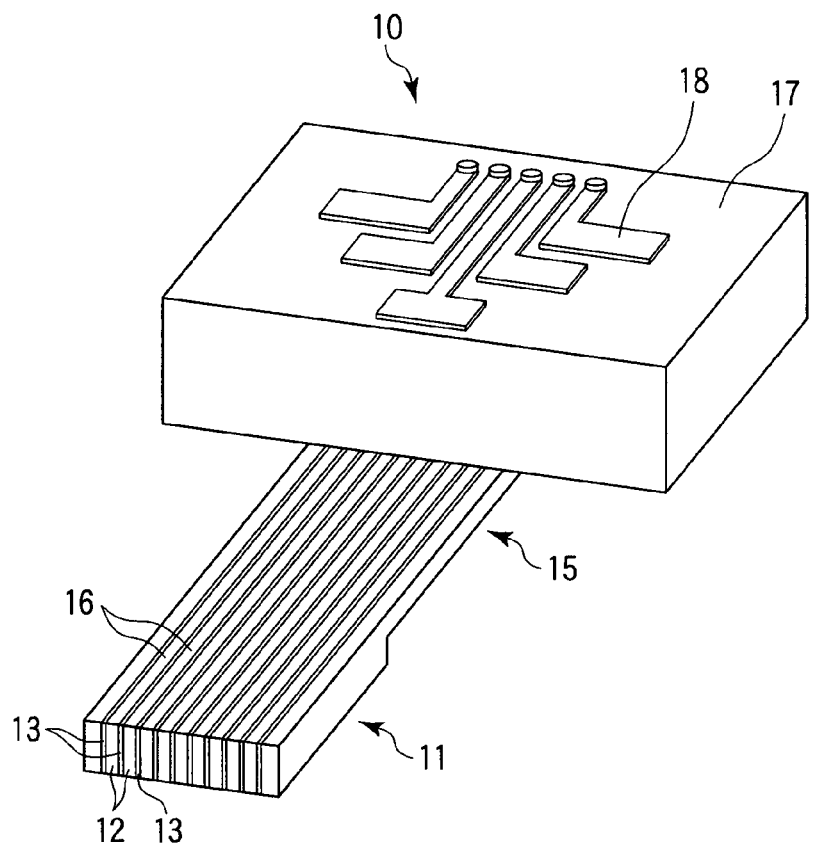
F I G. 2
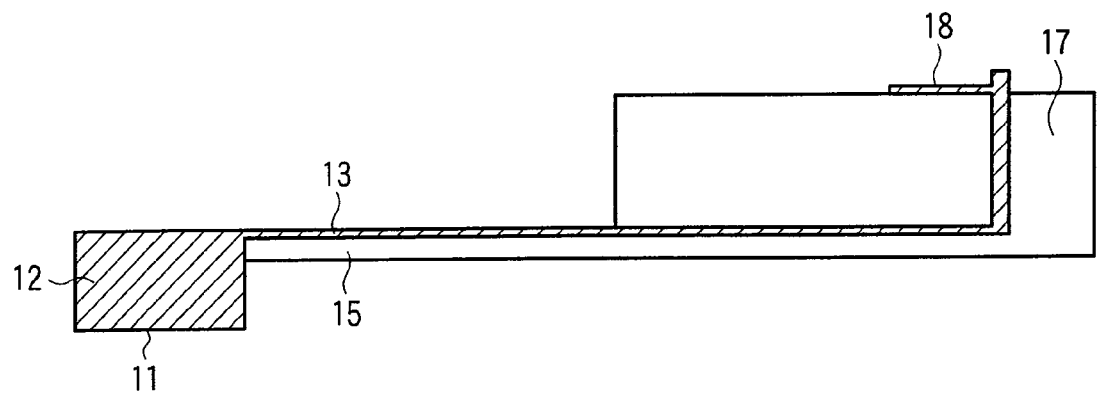
F I G. 3

MEMS MEMORY MICROPROBE AND RECORDING APPARATUS

CROSS-REFERENCE TO RELATED APPLICATIONS

This application is based upon and claims the benefit of priority from Japanese Patent Application No. 2010-019674, filed Jan. 29, 2010; the entire contents of which are incorporated herein by reference.

FIELD

Embodiments described herein relate generally to a microprobe used for a MEMS (Micro Electro Mechanical Systems) memory.

BACKGROUND

Information volumes to be handled by mobile phones with a movie capturing function, digital cameras exceeding six million pixels, and the like are rapidly increasing year by year, and an increase in capacity and a size reduction of information recording devices are demanded. A direct method of increasing the recording density of an information recording device is to reduce the size of a recording or reproduction bit in a hard disk or optical disk, and to reduce a unit cell size in a nonvolatile memory such as a flash memory. However, the method based on the existing principle (e.g., diffraction of light) encounters the physical limits of density enhancement in the near future. For example, in case of a hard disk drive, since the heat fluctuation influence of magnetism becomes more serious as the density increases, data may be destroyed at room temperatures if the density is simply increased under the present circumstances. Even in case of an optical disk, the size of a recording or reproduction bit approaches its limit due to a diffraction limitation of light. As a dominant measure that can break through such limits, a probe type MEMS memory using the principle of the scanning probe microscopy (SPM) has been studied.

The probe based memory device is a recording device in which probes are employed to write, read out, or erase information using various interactions between recording or reproduction electrodes of probe tip and a recording medium. When a microprobe is employed as a recording or reproduction head of the probe based memory device, some important factors such as a charge, resistance, current, and voltage have to be precisely measured by the microprobe. For this reason, it is important to assure the stable contact state between the microprobe tip and a recording medium at the time of recording or reproduction. When the contact state is insufficient, the recording or reproduction operation becomes unstable, thus causing a reliability drop of the probe based memory device. For this reason, it is important to ensure that the recording or reproduction electrodes contact recording medium at the time of recording or reproduction. In other words, it is important to eliminate a possibility of an unstable contact state between the recording or reproduction electrodes and the recording medium at the time of recording or reproduction.

Conventionally, in order to allow the probe based memory device to record or reproduce information at a high speed and high density, a sharpened type probe is usually employed. In this case, the size of the probe tip normally ranges from several nanometers to several hundred nanometers. The probe with a small tip size is much easier to wore out than a probe with a large tip when the same force is applied, resulting in a change in tip size. This will cause a change of recording or reproduction bit when the wore probe operates recording or reproduction behavior. As the wear progresses, the probe tip may not be able to operate recording or reproduction behavior or keep the stable contact state with the recording media, disabling the recording or reproduction operation.

The third page of JP-A 2006-221792 (KOKAI) describes experimental results about such wears of the probe tips. This experiment observes wearing state when the same load is applied to the sharpened type probe with a tip radius of 5 nanometers, and the blunt type with a tip radius 50 nanometers. The moving velocity of the probe is 2 µm/s. As can be seen from the experimental results, when the same load is applied, the sharp type probe is considerably worn compared to the blunt type. This is because the tip radius of the sharpened type probe is smaller than that of the blunt type, causing a concentration on the smaller tip when the same load is applied. Since the sharp type probe can write and read out a smaller recording or reproduction bit than the blunt type, a high-density recording device normally have to adopt the sharpened type.

BRIEF DESCRIPTION OF THE DRAWINGS

FIG. 2 is a perspective view of the MEMS memory microprobe when viewed from a top direction;

FIG. 3 is a sectional view of the MEMS memory microprobe taken along an A-A' direction in FIG. 1;

DETAILED DESCRIPTION

In general, according to one embodiment, a MEMS memory microprobe comprises a probe tip, a lever, and a base. The probe tip is arranged to oppose a recording medium and brought into contact with the recording medium to perform recording or reproduction of information. The lever assures electrical and mechanical connections between the probe tip and the base. In the probe tip, a plurality of recording or reproduction electrodes and a plurality of support portions which form the probe tip together with the electrodes is alternately arranged. The electrodes and the support portions form a single plane which opposes the recording medium.

First Embodiment

Figure 1:
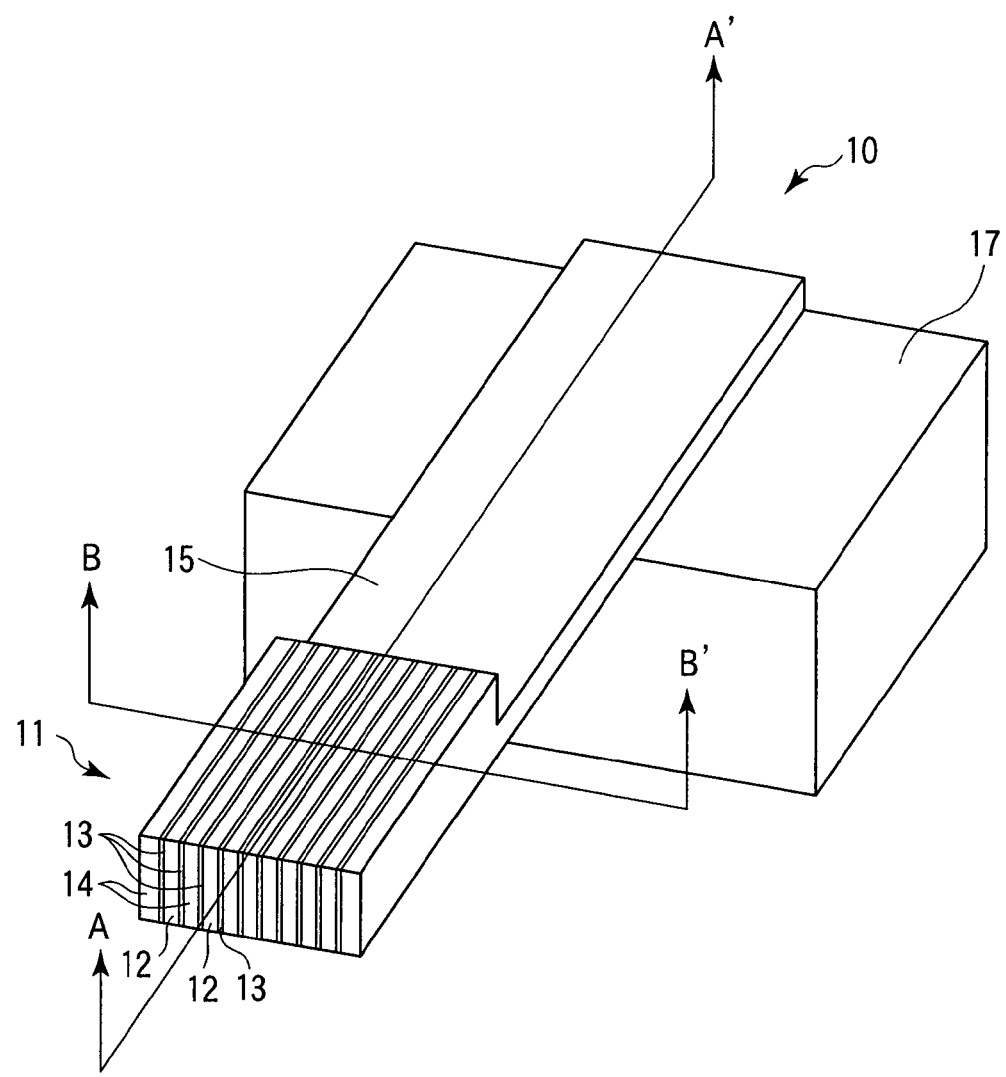
FIG. 1 is a perspective view of a MEMS memory microprobe according to the first embodiment when viewed from a bottom direction.

FIG. 1 is a perspective view of a MEMS memory microprobe according to the first embodiment when viewed from a certain direction, and FIG. 2 is a perspective view of the MEMS memory microprobe when viewed from another direction. A MEMS memory microprobe 10 according to this embodiment includes a probe tip 11, lever 15, and base 17. The lever 15 provides one of electrical connection and mechanical connection between the probe tip 11 and base 17. The lever 15 supports the probe tip 11, and the base 17 supports the lever 15.

A surface of the probe tip 11, which is illustrated to protrude upward from the lever 15 on the plane of paper in FIG. 1, opposes the recording medium. When the probe tip contacts the recording media and a current/voltage is applied between them, a recording or read-out operation is proceed. A MEMS memory is mainly configured by the microprobe 10 and the recording media according to this embodiment and the recording medium.

Note that this embodiment will explain a single microprobe 10 for the sake of simplicity. Also, as an alternative structure, a plurality of microprobes can be utilized to improve recording or reproduction rate.

The probe tip 11 has a plurality of support portions 14 and recording or reproduction slice electrodes 12, which are alternately arranged. Each surface of support portion 14 and the recording or reproduction slice electrode 12 have a rectangular parallelepiped shape and form a single plane. This plane opposes the recording medium, as described above. When the recording or reproduction slice electrodes 12 contact the recording medium and a current or voltage is applied between them, an information write/read-out operation (recording) is performed.

Note that the recording or reproduction slice electrodes 12 which are alternately arranged together with the support portions 14 are preferably configured using a material harder than the support portions 14.

Insulating layers 13 are formed between the neighboring support portions 14 and recording or reproduction slice electrodes 12 to be sandwiched between them. Each insulating layer 13 is, for example, an insulating oxide film (e.g., $SiO_2$). When the arrangement including the insulating layers 13 is adopted, electrical interferences between the plurality of slice electrodes 12 in the probe tip 11 can be suppressed. Since an electrical spot of each individual slice electrode 12 is focused by the insulating layer 13, a spread of a recording or reproduction bit can be prevented.

As shown in FIG. 2, a lever electrode array 16 is arranged on the lever 15, and a base electrode array 18 is formed on the base 17. The recording or reproduction slice electrodes 12 of the probe tip 11 are electrically connected to the base electrode array 18 via the lever electrode array 16 FIG. 3 is a sectional view of the MEMS memory microprobe according to the first embodiment shown in FIGS. 1 and 2 taken along an A-A' direction in FIG. 1, and FIG. 4 is a sectional view of the MEMS memory microprobe taken along a B-B' direction in FIG. 1.

Figure 4:
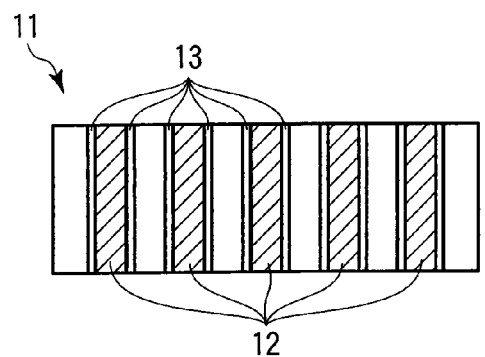
FIG. 4 is a sectional view of the MEMS memory microprobe taken along a B-B' direction in FIG. 1.

The lower side of the plane of paper of FIGS. 3 and 4 corresponds to a direction opposing the recording medium. As can be seen from FIGS. 3 and 4, arbitrary sections of the probe tip 11, which are parallel to a surface contacting the recording medium, are identical to each other. As the probe tip 11 has a constant section, the recording or reproduction operation of the probe can be maintained even when the probe tip 11 is worn after long-term sliding on the recording medium surface.

Figure 5A:
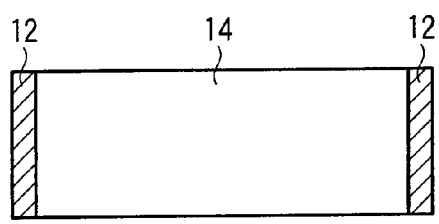
FIGS. 5A, 5B, 5C, 5D, 5E, and 5F are views showing some examples of recording or reproduction electrode layouts in the MEMS memory microprobe.
Figure 5B:
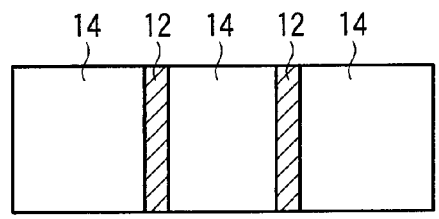
Figure 5C:
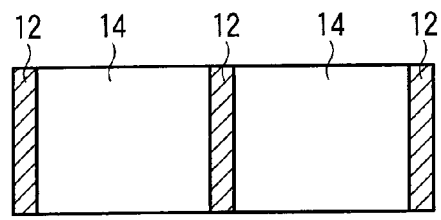
Figure 5D:
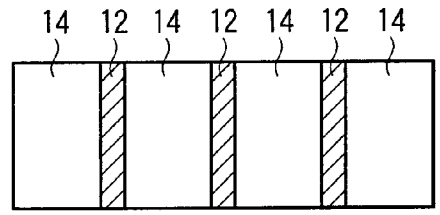
Figure 5E:
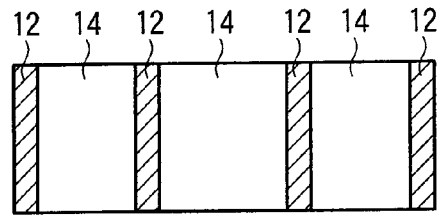
Figure 5F:
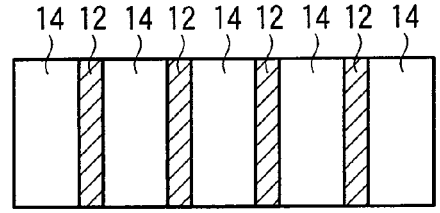

FIGS. 5A, 5B, 5C, 5D, 5E, and 5F are views showing some examples of recording or reproduction electrode layouts in the MEMS memory microprobe according to the first embodiment. FIGS. 1, 2, 3, and 4 show a case in which the five recording or reproduction slice electrodes 12 are arranged at equal intervals. However, the arrangement including the plurality of recording or reproduction slice electrodes 12 is not limited to this. For example, as shown in FIG. 5A, an arrangement in which the two recording or reproduction slice electrodes 12 may be arranged to sandwich the two sides of the support portion 14 may be adopted. FIG. 5B shows an arrangement in which the two recording or reproduction slice electrodes 12 are arranged at an interval narrower than that in FIG. 5A to be shifted to the center. FIGS. 5C and 5D show arrangement examples in which the three recording or reproduction slice electrodes 12 are similarly arranged. FIGS. 5E and 5F show arrangement examples in which the four recording or reproduction slice electrodes 12 are similarly arranged. The number of recording or reproduction slice electrodes 12 is not limited, and arrangements including one to several ten-thousand electrodes may be adopted.

Figure 6:
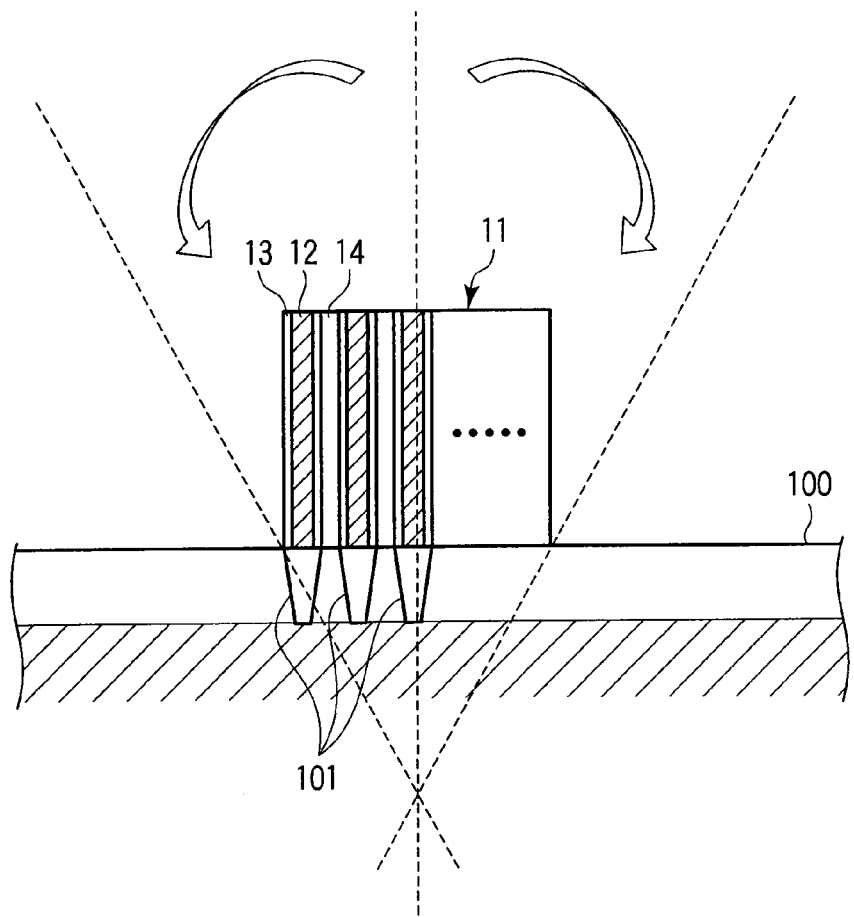
FIG. 6 is a view showing a state in which the probe tip of the MEMS memory microprobe contacts the recording medium to write or read out some recording or reproduction bits.

FIG. 6 is a view showing a state in which the probe tip 11 of the MEMS memory microprobe 10 according to the first embodiment contacts the recording medium. Referring to FIG. 6, reference numeral 100 denotes a recording medium; and 101, recording or reproduction bits on the recording medium 100.

When a current or voltage is applied between the recording or reproduction slice electrodes 12 and the recording medium 100, the recording or reproduction bits 101 can be wrote or read out.

On the other hand, based on electrical characteristic differences between portions where the recording or reproduction bits 101 are formed and those where the recording or reproduction bits are not formed, information recorded in the recording or reproduction bits 101 is read out via the slice electrodes 12.

A relative moving direction of the head (probe tip 11) with respect to the recording medium when the MEMS memory microprobe 10 writes or reads out information is called a probe scan direction. A plurality of recording or reproduction slice electrodes 12 are arranged in an array pattern along a direction parallel to such probe scan direction.

Figure 7:
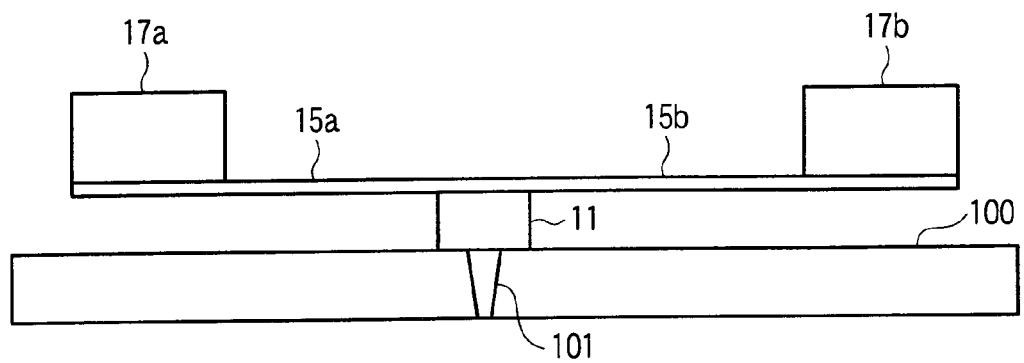
FIG. 7 is a view showing a case in which a lever of the MEMS memory microprobe adopts two-end fixed beam structure.

FIG. 7 is a view showing a case in which the lever of the MEMS memory microprobe adopts two-end fixed beam structure. In this case, the probe tip 11 can be supported by the lever 15a and 15b which are fixed on a base 17a and 17B, respectively. With this structure, the probe tip 11 can stably contact the recording medium 100.

The aforementioned first embodiment can provide the MEMS memory microprobe which has the arrangement in which the plurality of recording or reproduction slice electrodes 12 each having a size of several nanometers to several ten nanometers are arranged in the probe tip 11 having a size of several micrometers to several hundred micrometers, i.e., a multi-electrode function per probe, and can attain both a high recording or reproduction rate and high recording density using that probe.

Especially, by adopting the arrangement in which the plurality of recording or reproduction slice electrodes 12 are arranged, a possibility of a non-contact state between the recording or reproduction slice electrodes 12 and the recording or reproduction bits 101 of the recording medium 100 is lower than the arrangement including only one recording or reproduction slice electrode 12, and recording or reproduction can be reliably performed independently of a contact state between the probe tip 11 and recording medium 100, thus improving the reliability of the device.

Also, by adopting the arrangement in which the plurality of recording or reproduction slice electrodes 12 and support portions 14 (and insulating layers 13) are alternately arranged to form a single plane (contact surface), and such contact surface opposes and contacts the recording medium 100, a load acting on the recording or reproduction electrodes 12 upon contacting is dispersed. Therefore, according to this embodiment, since only a mechanical contact area can be increased without increasing an electrical contact area between the probe tip 11 and recording medium 100, wears of the recording or reproduction slice electrodes 12 can be suppressed.

Furthermore, according to the structure in which the probe tip 11 has constant sections in association with the contact surface with the recording medium, even when the probe tip 11 is worn by contact with the recording medium, the performance as the head can be maintained. By adopting the arrangement in which the recording or reproduction slice electrodes 12 which are alternately arranged together with the support portions 14 are configured using a material harder than the support portions 14, the recording or reproduction slice electrodes 12 are worn after the support portions 14 in the probe tip 11. As a result, the recording or reproduction slice electrodes 12 always protrude toward the contact surface side. Therefore, even after wearing, electrical contacts between the recording or reproduction slice electrodes 12 and recording medium 100 can be maintained, thus realizing stable recording or reproduction characteristics.

An example of the manufacturing processes associated with a test production example of the aforementioned MEMS memory microprobe will be described below with reference to FIGS. 8A, 8B, 8C, 8D, 8E, 8F, 8G, 8H, 8I, 8J, 8K, and 8L. In this test production, an SOI substrate 80 having a device layer thickness of 10 micrometers, a box layer thickness of 0.5 micrometers, and a handling layer thickness of 380 micrometers was used.

Figure 8A:
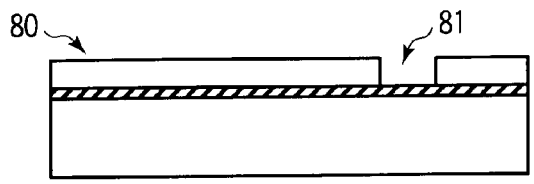
FIGS. 8A, 8B, 8C, 8D, 8E, 8F, 8G, 8H, 8I, 8J, 8K, and 8L are views showing an example of the manufacturing processes of the MEMS memory microprobe.
Figure 8B:
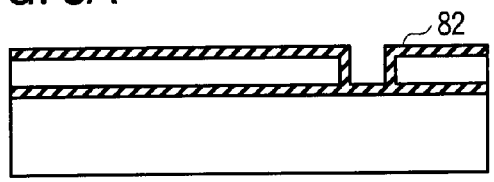
Figure 8H:
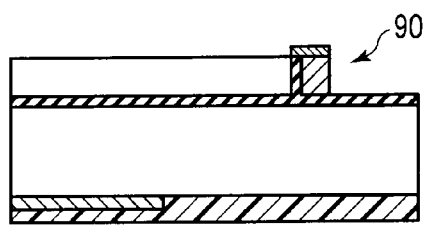
Figure 8C:
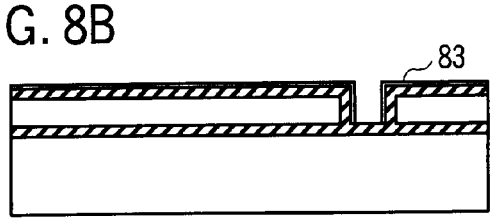

A trench 81 of a probe tip is formed on a device layer of the SOI substrate 80 by lithography and a DRIE (Deep Reactive Ion Etching) process (FIG. 8A). An insulating film (SiO2) is formed on the surface formed with this trench 81 by a thermal oxidation process (FIG. 8B). Furthermore, a Cr/Au film 82 is deposited (FIG. 8C).

Figure 8I:
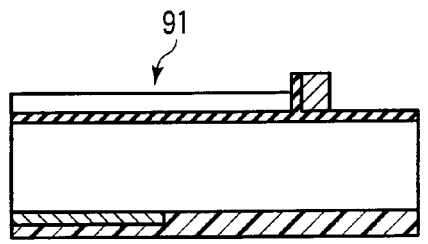
Figure 8D:
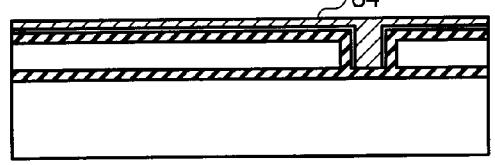
Figure 8E:
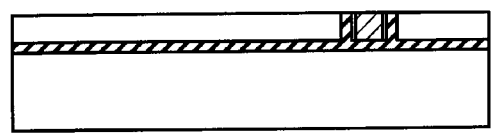
Figure 8J:
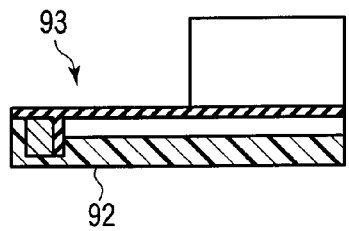
Figure 8F:
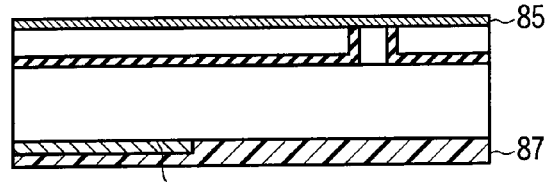
Figure 8K:
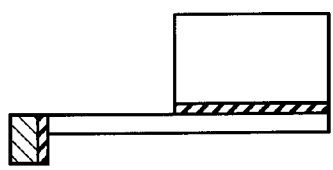
Figure 8G:
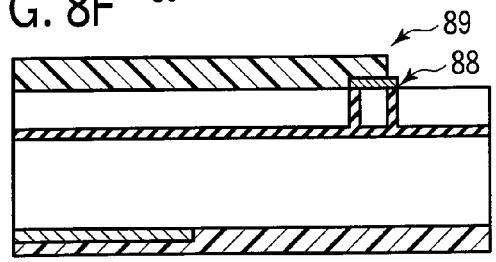
Figure 8L:
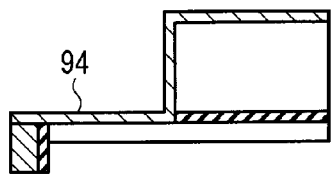

Next, after an Au film 84 is filled in a trench 84 formed on the device layer (FIG. 8D), three layers, i.e., the Au layer 81, Cr/Au layer 83, and SiO2 layer are polished (FIG. 8E). Al film 85 and 86 are deposited on the top and bottom surfaces. After the bottom surface undergoes lithography and Al etching, A Al mask 86 used to form the base 17 is formed. Then, a resist film 87 is coated on the bottom surface to protect the Al mask 86 in FIG. 8E. Next, by performing a lithography and Al etching process, Al mask 88 used to form the probe tip is formed on the top surface of SOI substrate. After that, by doing the lithography process again, a resist mask 89 is formed on the top surface of SOI substrate to form the probe shape (FIG. 8G). Then, DRIE processes 90, 91, and 92 are executed again to form a probe shape (FIGS. 8H, 8I, and 8J). A resist film 91 is coated to the top surface, and the top surface then undergoes Al etching. Next, the oxide film (SiO2) is removed (BHF), and Al etching is performed. Then, the resist film 91 is removed (FIG. 8K). Finally, an Al film 94 is deposited on the bottom surface (FIG. 8L), thus completing the microprobe.

Second Embodiment

Figure 9B:
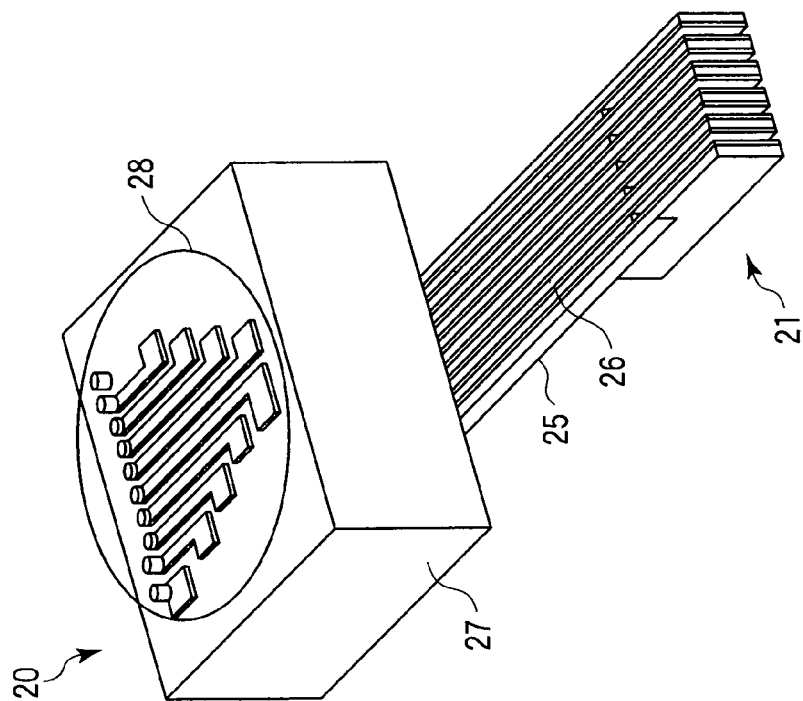
FIGS. 9A and 9B are perspective views showing a MEMS memory microprobe according to the second embodiment.
Figure 9A:
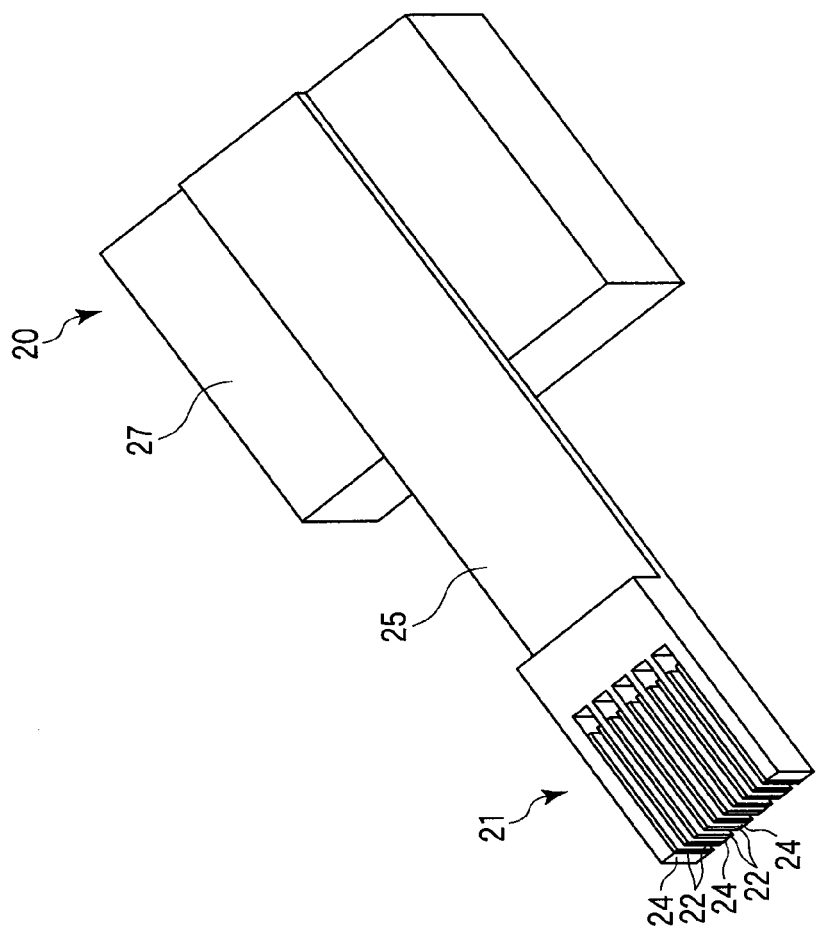

FIGS. 9A and 9B are perspective views showing a MEMS memory microprobe according to the second embodiment.

A MEMS memory microprobe 20 according to the second embodiment includes a probe tip 21, lever 25, and base 27. The base 27 supports the probe tip 21 and lever 25.

A surface of the probe tip 21, which is illustrated to protrude upward from the lever 25 on the plane of paper in FIG. 9A, opposes a recording medium. When the probe tip 21 contacts the recording media and a current/voltage is applied between them, a recording or read-out operation is performed. A MEMS memory is mainly configured by the microprobe 20 and the recording media according to this embodiment.

The probe tip 21 of the probe 20 is configured by support portions 24 which have a through trench structure, and recording or reproduction thin film electrodes 22 which are coated on respective side walls of trenches of the support portions 24. One surface of each support portion 24 and that of each recording or reproduction thin film electrode 22 form a single plane. This plane opposes the recording medium, as described above, and the recording or reproduction thin film electrodes 22 contact the recording medium to perform a recording or reproduction operation.

As shown in FIG. 9B, a lever electrode array 26 is arranged on the lever 25, and a base electrode array 28 is formed on the base 27. The recording or reproduction thin film electrodes 22 of the probe tip 21 are electrically connected to the base electrode array 28 via the electrode array 26 of the lever 25.

As in the first embodiment, a two-end fixed beam structure shown in FIG. 7 may be adopted in the second embodiment.

According to the second embodiment, as in the first embodiment, a possibility of a non-contact state between the recording or reproduction electrodes of the probe tip and the recording medium at the time of recording or reproduction has to be low to realize stable recording or reproduction characteristics. In addition, in the probe tip, the recording or reproduction thin film electrodes 22 are formed on the side walls of the trenches of the support portion 24. By thinning the recording or reproduction thin film and arranging the probe in array, the probe based memory device can realize a recording or reproduction at a high density and high transfer rate.

Third Embodiment

Figures 10A, 10B:
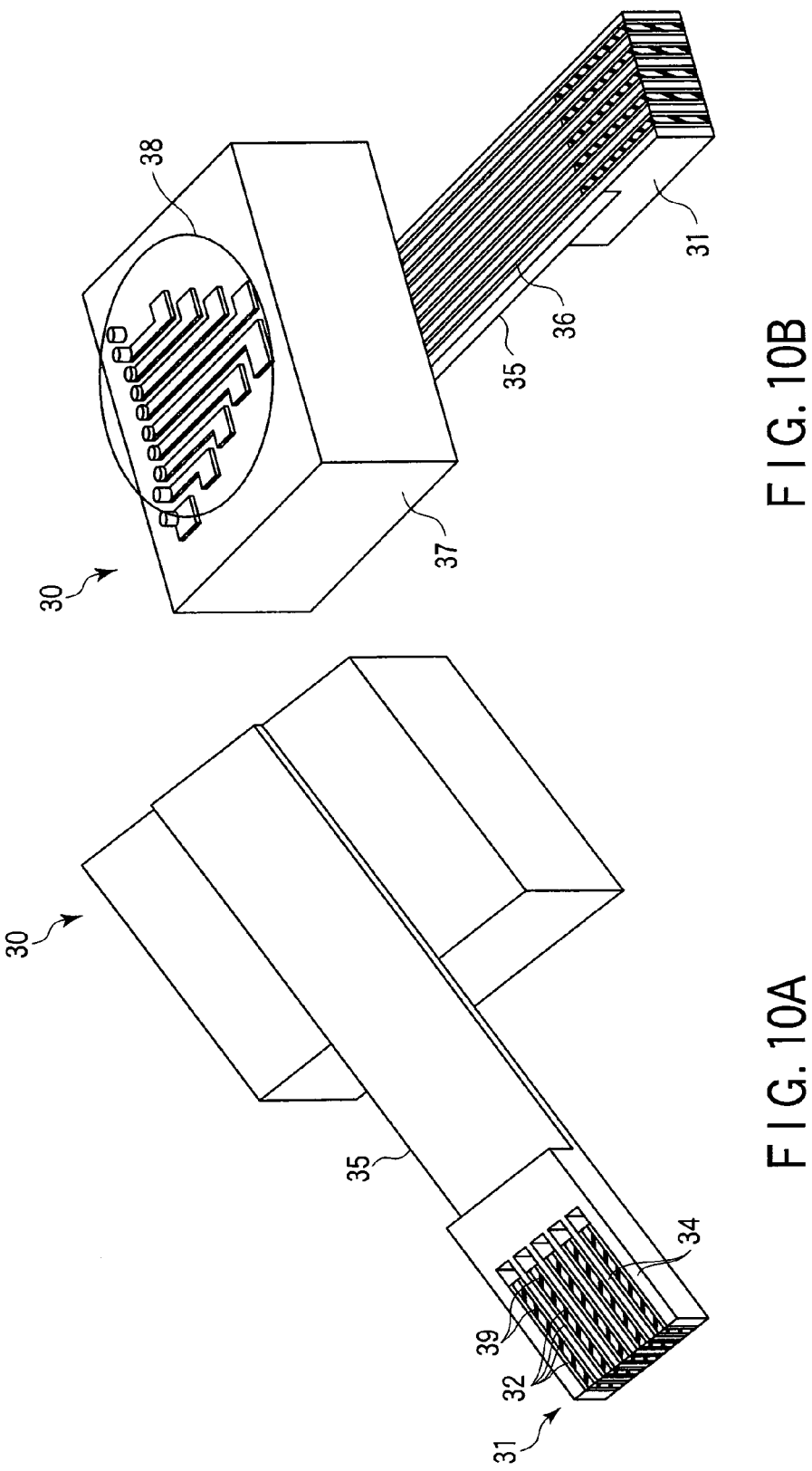
FIGS. 10A and 10B are perspective views showing a MEMS memory microprobe according to the third embodiment.

FIGS. 10A and 10B are perspective views showing a MEMS memory microprobe according to the third embodiment.

A MEMS memory microprobe 30 according to the third embodiment includes a probe tip 31, lever 35, and base 37. The base 37 supports the probe tip 31 and lever 35.

A surface of the probe tip 31, which is illustrated to protrude upward from the lever 35 on the plane of paper in FIG. 10A, opposes a recording medium. When the probe tip 21 contacts the recording media and a current/voltage is applied between them, a recording or read-out operation is performed. A MEMS memory is mainly configured by the microprobe 20 and the recording media 200 according to this embodiment.

The probe tip 31 is configured by support portions 34 which have a through trench structure, recording or reproduction thin film electrodes 32 which are coated on respective side walls of trenches of the support portions 34, and inter-electrode insulating layers 39 each of which is inserted between two opposing recording or reproduction thin film electrodes 32 in each trench.

The surface of support portions 34, recording or reproduction thin film electrode 32 and inter-electrode insulating layers 39 form a single plane. This plane opposes the recording medium.

As described above, when the probe tip 21 contacts the recording media and a current/voltage is applied between them, a recording or read-out operation is performed.

As shown in FIG. 10B, a lever electrode array 36 is arranged on the lever 35, and a base electrode array 38 is formed on the base 37. The recording or reproduction thin film electrodes 32 of the probe tip 31 are electrically connected to the base electrode array 38 via the lever electrode array 36.

As in the first embodiment, a two-end fixed beam structure shown in FIG. 7 may be adopted in the third embodiment, too.

According to the third embodiment, as in the first embodiment, the contact state between the recording or reproduction electrodes of the probe tip and the recording medium at the time of recording or reproduction will greatly affect the recording or reproduction performance. For a plurality of electrodes that are arranged in the probe tip, the contact probability of the electrodes and the recording media will be enhanced, stabilizing the recording or reproduction performance.

In addition, in the probe tip, the recording or reproduction thin film electrodes 32 are formed on the side walls of the trenches of the support portion 34 and each of them are insulated by inter-electrode insulating layers 39. By thinning the recording or reproduction thin film and arranging the probe in arrays, the probe based memory device can realize a recording or reproduction at a high density and high transfer rate.

Furthermore, according to the third embodiment, since each inter-electrode insulating layer 39 is inserted between the two opposing recording or reproduction thin film electrodes 32 in the trench, an electrical interference between the two recording or reproduction thin film electrodes 32 can be suppressed, thus realizing more stable recording or reproduction characteristics.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A Micro Electro Mechanical Systems (MEMS) memory microprobe arranged to oppose a recording medium, the microprobe comprising:
a probe tip comprising:
a plurality of electrodes; and
a plurality of support portions,
wherein one or more of the electrodes and one or more of the support portions are alternately arranged and form a first probe tip surface and a second probe tip surface intersecting with each other,
wherein the first probe tip surface comprises first electrode surfaces of the one or more of the electrodes and first support portion surfaces of the one or more of the support portions,
wherein the second probe tip surface comprises second electrode surfaces of the one or more of the electrodes and second support portion surfaces of the one or more of the support portions, and
wherein the first probe tip surface opposes the recording medium;
a lever providing at least one of electrical connection or mechanical connection with the probe tip; and
a base providing at least one of electrical connection or mechanical connection with the lever.

2. The microprobe according to claim 1, wherein a material of the electrodes is harder than a material of the support portions.

3. The microprobe according to claim 1, further comprising insulating layers sandwiched between the electrodes and the support portions.

4. The microprobe according to claim 1, wherein arbitrary sections of the probe tip parallel to the first probe tip surface are identical to each other.

5. The microprobe according to claim 1, wherein the electrodes are arranged in an array pattern along a direction parallel to a probe scan direction as a relative moving direction of the probe tip with respect to the recording medium.

6. The microprobe according to claim 1, wherein the lever comprises a first lever which supports the probe tip from a first direction, and a second lever which supports the probe tip from a second direction opposite to the first direction.

7. A recording apparatus comprising:
a recording medium; and
a microprobe arranged to oppose the recording medium, the microprobe comprising:
a probe tip comprising:
a plurality of electrodes; and
a plurality of support portions,
wherein one or more of the electrodes and one or more of the support portions are alternately arranged and form a a first probe tip surface and a second probe tip surface intersecting with each other,
wherein the first probe tip surface comprises first electrode surfaces of the one or more of the electrodes and first support portion surfaces of the one or more of the support portions,
wherein the second probe tip surface comprises second electrode surfaces of the one or more of the electrodes and second support portion surfaces of the one or more of the support portions, and
wherein the first probe tip surface opposes the recording medium;
a lever providing at least one of electrical connection or mechanical connection with the probe tip; and
a base providing at least one of electrical connection or mechanical connection with the lever.

8. The apparatus according to claim 7, wherein a material of the electrodes is harder than a material of the support portions.

9. The apparatus according to claim 7, further comprising insulating layers sandwiched between the electrodes and the support portions.

10. The apparatus according to claim 7, wherein arbitrary sections of the probe tip parallel to the first probe tip surface are identical to each other.

11. The apparatus according to claim 7, wherein the electrodes are arranged in an array pattern along a direction parallel to a probe scan direction as a relative moving direction of the probe tip with respect to the recording medium.

12. The apparatus according to claim 7, wherein the lever comprises a first lever which supports the probe tip from a first direction, and a second lever which supports the probe tip from a second direction opposite to the first direction.

* * * * *